United States Patent [19]

Konno

[11] Patent Number: 5,777,831
[45] Date of Patent: Jul. 7, 1998

[54] TAPE CASSETTE

[75] Inventor: Toshikazu Konno, Miyagi, Japan

[73] Assignee: Sony Corporation, Tokyo, Japan

[21] Appl. No.: 746,153

[22] Filed: Nov. 6, 1996

Related U.S. Application Data

[63] Continuation of Ser. No. 295,221, Aug. 24, 1994, abandoned, which is a continuation of Ser. No. 18,441, Feb. 16, 1993, abandoned.

[30] Foreign Application Priority Data

Feb. 18, 1992 [JP] Japan ................... 4-061015

[51] Int. Cl.[6] .................. G11B 23/02; G11B 23/04
[52] U.S. Cl. .................. 360/132; 242/346.2
[58] Field of Search .................. 360/132, 131; 242/188, 199, 346.2, 615.2

[56] References Cited

U.S. PATENT DOCUMENTS

| | | | |
|---|---|---|---|
| 4,352,473 | 10/1982 | Satoh et al. | 242/199 |
| 4,466,585 | 8/1984 | Maehara | 360/132 |
| 4,518,134 | 5/1985 | Oishi et al. | 242/199 |
| 4,558,387 | 12/1985 | Shiba et al. | 360/132 |
| 5,034,839 | 7/1991 | Okamura et al. | 360/132 |

FOREIGN PATENT DOCUMENTS

| | | |
|---|---|---|
| 0191307 | 8/1986 | European Pat. Off. |
| 2026436 | 2/1980 | Japan ............ 360/132 |
| 94173 | 6/1983 | Japan ............ 360/132 |
| 1010479 | 1/1989 | Japan . |
| 2219986 | 12/1989 | United Kingdom . |

*Primary Examiner*—Allen Cao
*Attorney, Agent, or Firm*—Jay H. Maioli

[57] ABSTRACT

A tape cassette having upper and lower half members includes a tape guide formed of substantially cylindrical fixed and rotating members, the fixed member being fixed in the cassette by engagedly inserting bosses projecting from inner flat surfaces of the upper and lower half members into a hole in the fixed member, the rotating member being freely rotatable around the fixed member, and steps formed peripherally around the bosses adjacent the inner flat surfaces of the upper and lower half members between first portions confronting end surfaces of the fixed member and second portions confronting end surfaces of the rotating member so that the first portions are projected inwardly of the frame body relative to the second portions.

8 Claims, 7 Drawing Sheets

TAPE CASSETTE

This is a continuation of application Ser. No. 08/295,221 filed Aug. 24, 1994, which is a continuation of application Ser. No. 08/018,441, filed Feb. 16, 1993 both now abandoned.

BACKGROUND OF THE INVENTION

1. Field of the Invention

This invention relates to a tape cassette for a video tape recorder (VTR), etc., and more particularly to a tape cassette having a tape guide which is rotatable in accordance with the running of a tape, and in which a sliding or slipping motion of the tape relative to the tape guide is minimized.

2. Description of Related Art

For example, a VTR tape cassette 20 of VHS mode as shown in FIG. 6 is so designed that a magnetic tape T fed out from the side of a supply reel 21 runs along the front face of the tape cassette 20 so as to be slidably contacted with a tape guide member 22 and a guide roller 23, and then wound up by a wind-up reel 24.

The tape guide member 22 with which the magnetic tape T is slidably contacted so that its tape running position (path) is guided, is designed in a cylindrical form as shown in a cross-sectional view of FIG. 7(a). Bosses 25 and 26 are respectively formed at fixing positions of the tape guide member 22 on an upper half 20a and a lower half 20b which constitute a frame body of the tape cassette 20. One of the bosses, for example, the boss 26 is particularly formed with a predetermined number of press-fitting ribs 26a on the peripheral surface thereof.

The tape guide member 22 is secured to the tape cassette 20 by engagedly inserting the bosses 25 and 26 into a cylindrical hole 22h of the tape guide member 22 from the upper and lower sides thereof as shown in FIG. 7(c) when the upper half 20a and the lower half 20b are fabricated with each other. The tape guide member 22 is fixedly secured to the tape cassette 20, particularly by breaking the press-fitting ribs 26a on the peripheral surface of the boss 26 when the boss 26 is inserted into the cylindrical hole 22h of the tape guide member during manufacture.

There may be used another manner for installing the tape guide member 22 as shown in FIGS. 8(a) to 8(c) in which no rib is provided to the bosses 25 and 26, and the bosses 25 and 26 are used merely as a positioning member for the tape guide member 22. In this case, at the time when the upper and lower halves 20a and 20b are fixedly engaged with each other during manufacture, the bosses 25 and 26 are engagedly inserted into the hole 22h, and the tape guide member 22 is fixedly sandwiched in a direction as indicated by an arrow A by the upper and lower halves 20a and 20b.

However, in comparison with the manner of installing the tape guide member 22 as described above in which the tape guide member 22 is fixedly secured in the frame body and the magnetic tape T is slidably contacted with the fixed tape guide member 22 so that the tape path is guided, the following manner is more preferable in improvement of durability of the magnetic tape T and the tape guide member. That is, the tape guide member 22 is so designed as to be freely rotatable and thus a sliding or slipping motion is suppressed between the magnetic tape T and the tape guide member 22.

In view of the above, there has been proposed a tape guide member 22 as shown in a cross-sectional view of FIG. 9. The tape guide member 22 comprises an inner cylindrical fixing member 22a and an outer cylindrical rotatable member 22b which is freely rotatably mounted around the inner cylindrical fixing member 22a, and the tape guide member 22 is fixed in a space between the upper and lower halves by engagedly inserting the bosses 25 and 26 into the hole 22h of the inner cylindrical fixing member 22a. The rotating member 22b is provided with a projection $22b_1$ on the inner peripheral surface thereof so as to extend inwardly in the peripheral direction thereof, and the fixing member 22a is provided with a groove $22a_1$ on the outer peripheral surface thereof so as to extend inwardly in the peripheral direction thereof. The rotating member 22b is mounted around the fixing member 22a in a state where the projection $22b_1$ is engaged with the groove $22a_1$, so that the rotating member 22b is prevented from shifting upwardly and downwardly relative to the fixing member 22a.

Further, as shown in FIG. 9, the dimension $L_1$ of the frame body of the fixing member 22a in its thickness direction is set to be slightly longer than the dimension $L_1$ of the frame body of the rotating member 22b in its thickness direction, whereby the rotating member 22b is prevented from being slidably contacted with the inner flat surfaces of the upper and lower halves 20a and 20b of the cassette during rotation to thereby maintain smooth rotating operation of the rotating member 22b.

However, the rotating member 22b is unintentionally moved in some degree in the thickness direction (as indicated by the arrow A) of the frame body because some degree of clearance or dimensional error occurring in a molding process exists at the setting portion of the fixing member 22b and the rotating member 22a, that is, between the projection $22b_1$ and the groove $22a_1$. Due to such instability of the rotating member 22b, the upper and lower end surfaces $22b_1$ of the rotating member 22b is relatively easily contacted with the inner flat wall of the upper half 20a or lower half 20b, so that the smoothly rotating operation of the rotating member 22b is disturbed.

In addition, the upper and lower halves 20a and 20b are frequently warped in some degree. In this case, for example when the lower half 20b is warped in the inward direction of the frame body as shown in FIG. 10, the end surface $22b_1$ of the rotating member 22b is more easily contacted with the lower half 20b, and thus the rotating operation of the rotating member 22b is disturbed.

Further, as shown in FIG. 11, there are some cases where recessed portions $20a_1$ and $20b_1$ having small steps are unintentionally formed on the periphery of the bosses 25 and 26 by an insert die of a mold. In this case, portions $20a_2$ and $20b_2$ which are stopped inward of the frame body relative to the recessed portions $20a_1$ and $20b_1$ are completely contacted with the end surface $22b_3$ of the rotating member 22b, so that the rotating member is fixedly sandwiched by the portions $20a_2$ and $20b_2$ so that rotation thereof is impossible.

SUMMARY OF THE INVENTION

An object of this invention is to provide a tape cassette in which a sliding or slipping motion of a tape relative to a tape guide is minimized.

In order to attain the above object, a tape cassette according to this invention in which a tape-shaped recording medium is accommodated in a frame body formed by upper and lower half members while wound up by a pair of reels, includes tape guide means for guiding the running position of the tape-shaped recording medium, a partial or whole portion of the tape guide means having a substantially-cylindrical fixed member and a substantially-cylindrical

3 rotating member, wherein the fixed member is fixed in the frame body by engagedly inserting bosses projected from the upper and lower half members into a hole of the fixed member while the rotating member is freely rotatably mounted on the peripheral surface of the fixed member, and wherein steps are formed at the peripheral portions of the bosses for fixedly securing the fixed member to the inner flat surfaces of the upper and lower half members between a first ring-shaped portion confronting the end surface of the fixed member and a second ring-shaped portion confronting the end surface of the rotating member so that the first ring-shaped portion is projected more inwardly of the frame body than the second ring-shaped portion.

According to the tape cassette of this invention, on the upper and lower halves, the portion confronting the fixed member is so designed as to be project inside of the frame body relative to the portion confronting the rotating member, and thus a surplus space is formed between the upper and lower end surfaces of the rotating member and the upper and lower halves, so that the rotating member does not contact the half members even when the rotating member mounted on the fixed member is moved in the thickness direction of the frame body or the half members are warped in some degree.

DETAILED DESCRIPTION OF PREFERRED EMBODIMENTS

A first embodiment of this invention will be hereunder described with reference to FIGS. 1 to 3.

Figure 3:
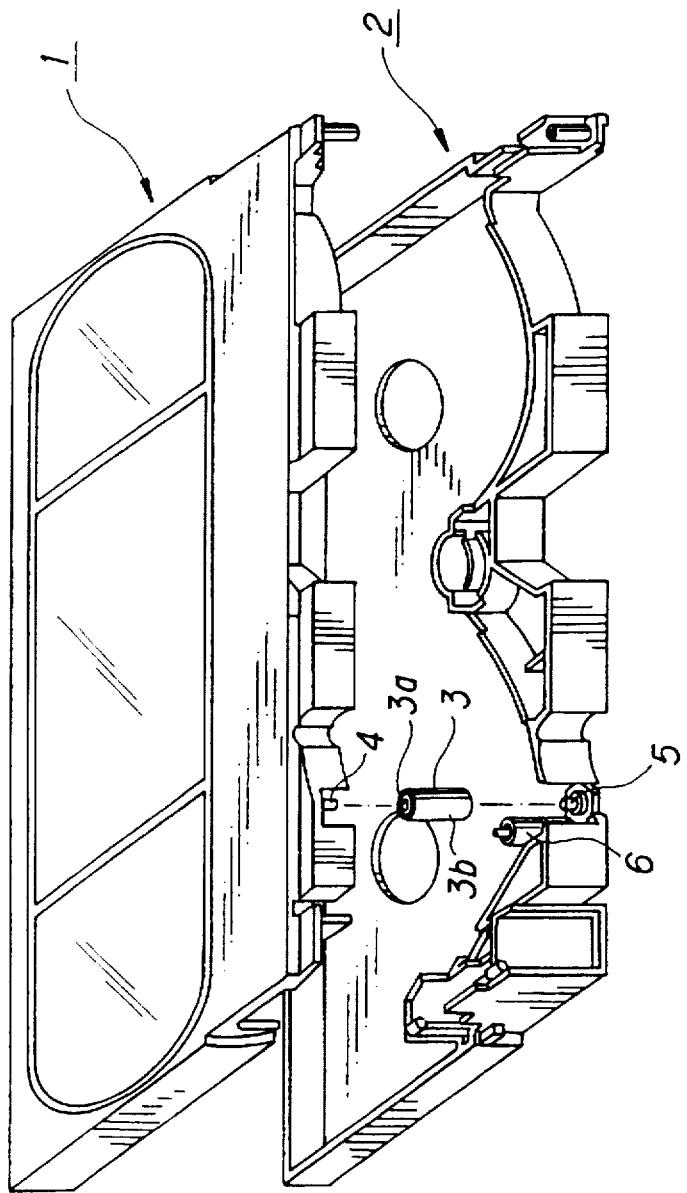
FIG. 3 is a perspective view of a frame body and a tape guide member of the tape cassette of this embodiment.

FIG. 3 is a perspective view of upper and lower halves and a tape guide member of a VTR tape cassette of VHS mode. A reference numeral 1 represents an upper half, a reference numeral 2 represents a lower half, a reference numeral 3 represents a tape guide member, and reference numerals 4 and 5 represent bosses which are projectingly provided at predetermined positions on the upper and lower halves 1 and 2, respectively. A reference numeral 6 represents a guide roller mechanism which is provided adjacent to the tape guide member 3.

The tape cassette accommodates a magnetic tape in a frame body constructed by the upper and lower halves 1 and 2 (not shown) in a state where the magnetic tape is wound up by a supply reel and a wind-up reel. The tape cassette is so designed that the magnetic tape drawn out of the supply reel is guided to the front face side of the frame body, then guided along its running position by the tape guide member 3 and the guide roller mechanism and then is fed to the wind-up reel side. Particularly in this embodiment, the tape guide member 3 comprises an inner cylindrical fixed member 3a, and an outer cylindrical rotating member 3b. The outer cylindrical rotating member 3b which will be contacted with the magnetic tape is freely rotatably disposed around the inner cylindrical fixed member 3a, to thereby promote the suppression of the sliding or slipping motion between the tape guide member 3 and the magnetic tape, and prolong the life of the magnetic tape and the tape guide member. FIG. 2 is an enlarged exploded perspective view of the mechanism of the tape guide member 3 of this embodiment. The fixing state of the tape guide member 3 by the bosses 4 and 5 is shown in a cross-sectional view of FIG. 1.

As is apparent from these figures, the rotating member 3b is formed with a projection $3b_1$ on the inner peripheral surface thereof in a peripheral direction thereof and extending inwardly, and the fixed member 3a is formed with a groove $3a_1$ on the outer peripheral surface thereof extending in an inner peripheral direction thereof. When the fixing member 3a is inserted into a hole $3b_h$ of the rotating member 3b, the projection $3b_1$ is engaged with the groove $3a_1$ to allow the rotating member 3b to be mounted on the fixing member 3a in such a manner that the rotating member 3b is rotatable relative to the fixed member 3a and is prevented from shifting relative to the fixed member 3a upwardly and downwardly.

Further, the fixing member 3a is fixed between the upper and lower halves 2 and 3 by engaging the bosses 4 and 5 projected from the inner flat surfaces of the upper and lower halves 1 and 2 with the hole $3a_h$. In addition, the dimension $L_1$ of the fixed member 3a in the thickness direction of the frame body is set to be longer than the dimension $L_1$ of the rotating member 3b in the thickness direction of the frame body, so that the contact between the rotating member 3b and the inner flat surfaces of the upper and lower halves 1 and 2 is intentionally avoided.

Still further, the peripheral portion of each of the bosses 4 and 5 is formed in a convex shape projecting in the inward direction of the frame body (these portions are hereinafter referred to as "convex portions" 6 and 7). As is apparent from FIG. 1, the convex portions 6 and 7 are formed on only those areas which confront the upper and lower end surfaces $3a_1$ of the fixing member 3a, that is, the convex portions 6 and 7 are formed on the inner flat surfaces of the upper and lower halves 1 and 2 in such a manner that flat portions 6a and 7a of the convex portions 6 and 7 are confronted to the upper and lower end surfaces $3a_2$ of the fixed member 3a, but not to the upper and lower end surfaces $3b_2$ of the rotating member 3b. Therefore, the upper and lower end surfaces $3b_2$ of the rotating member 3b are confronted to those portions on the inner flat surfaces of the upper and lower halves 1 and 2, which are adjacent to the flat portions 6a and 7a of the convex portions 6 and 7 and located at lower positions than the flat portions 6a and 7a by one step.

With the construction as described above, a space between the end surfaces $3b_2$ of the rotating member 3b and the upper and lower halves 1 and 2 is provided with a sufficient gap, so that the rotating member 3b is hardly moved in the thickness direction of the frame body relatively to the fixed member 3a, and the end surfaces $3a_2$ of the rotating member 3b is hardly contacted with the inner flat surface of the upper or lower half 1 or 2 even when the upper and lower halves 1 and 2 are warped. Therefore, the rotating member 3b can be smoothly rotated at all times.

Figure 4:
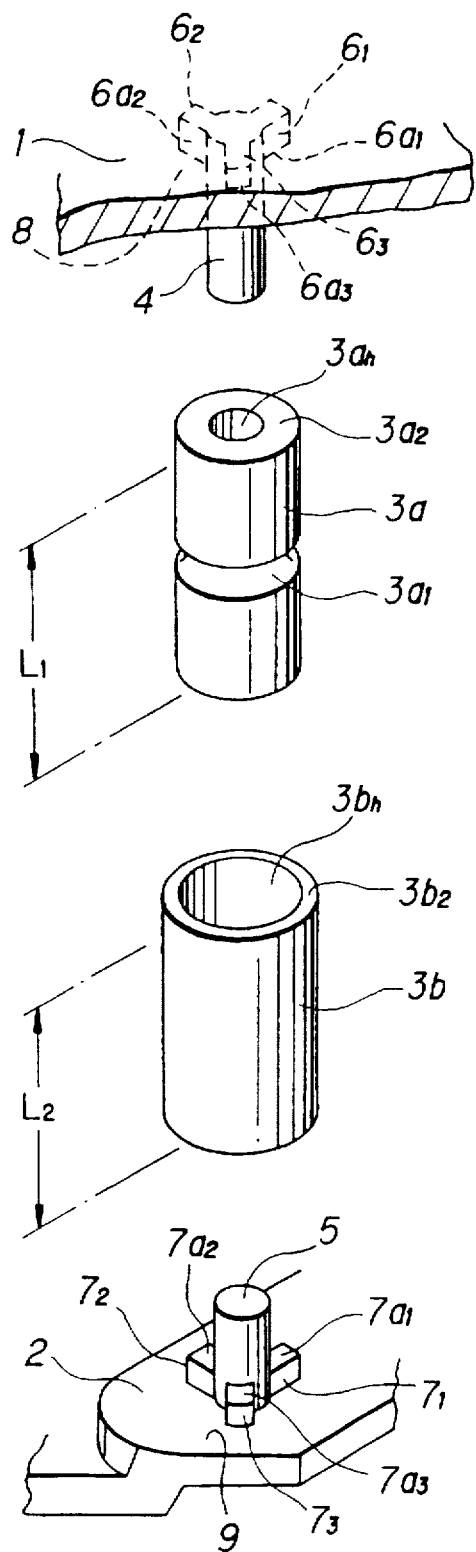
FIG. 4 is an exploded perspective view of a tape guide member and a boss of a modification of this embodiment.

FIG. 4 shows a modification of this embodiment. In this case, each of the convex portions 6 and 7 to be formed on the peripheral portion of each of the bosses 4 and 5 is not continuously formed over the whole periphery of each of the bosses 4 and 5, but plural convex portions are intermittently or partially formed on the peripheral portion of each of the bosses 4 and 5 with three convex portions being grouped as an unit. In this modification, a group of convex portions $6_1$, $6_2$ and $6_3$ and a group of convex portions $7_1$, $7_2$ and $7_3$ are formed on the peripheral portions of the bosses 4 and 5, respectively. In this case, the flat surface portions $6a_1$, $6a_2$ and $6a_3$ of the convex portions $6_1$, $6_2$ and $6_3$ and the flat surface portions $7a_1$, $7a_2$ and $7a_3$ of the convex portions $7_1$, $7_2$ and $7_3$ are also designed as to be confronted to the upper and lower end surfaces $3a_h$ of the fixed member 3a, but not to be confronted to the end surfaces $3b_2$ of the rotating member 3b, so that the same effect as described above is obtainable in this modification. Of course, the number of the convex portions constituting a group (unit) which are formed on the periphery of each boss is not limited to three.

Figure 5:
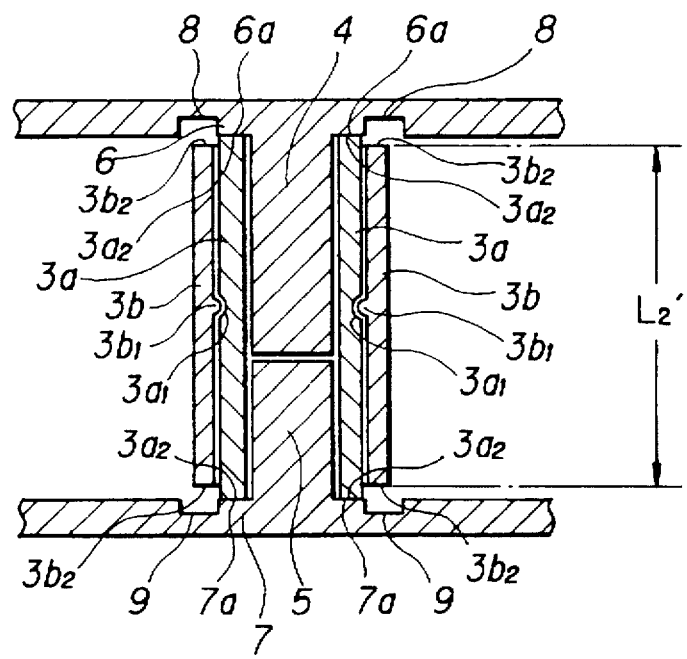
FIG. 5 is a cross-sectional view of the fixing state of a tape guide member of a tape cassette of another embodiment according to this invention.
Figure 6:
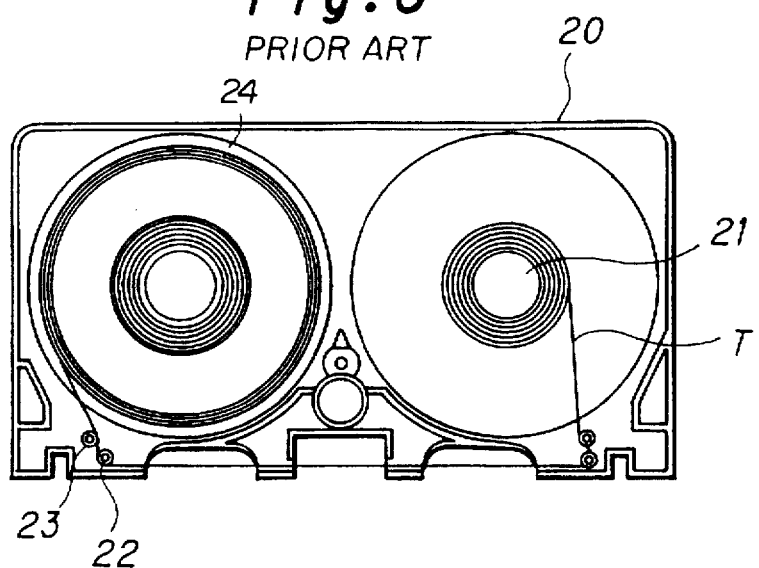
FIG. 6 is an explanatory diagram of the tape cassette.
Figure 7A:
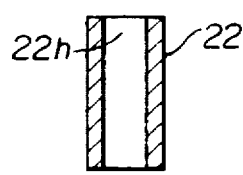
FIG. 7(a)–7(c) is an explanatory diagram of a conventional tape guide member.
Figure 7B:
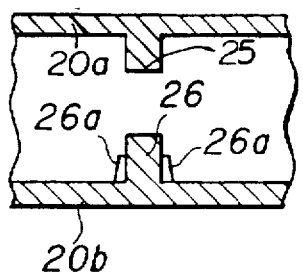
Figure 7C:
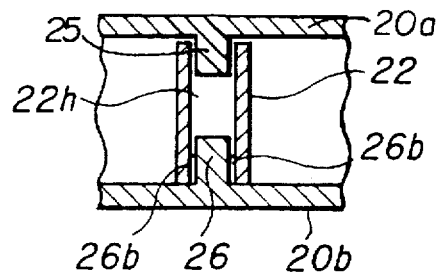
Figure 8A:
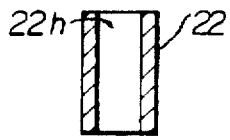
FIG. 8 (a)–8(c) is an explanatory diagram of another conventional tape guide member.
Figure 8B:
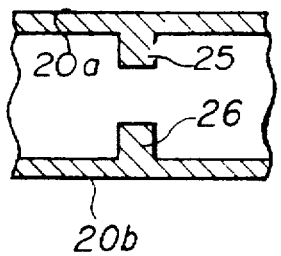
Figure 8C:
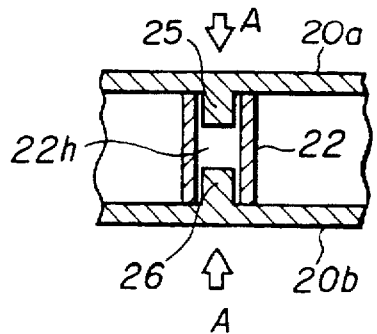
Figure 9:
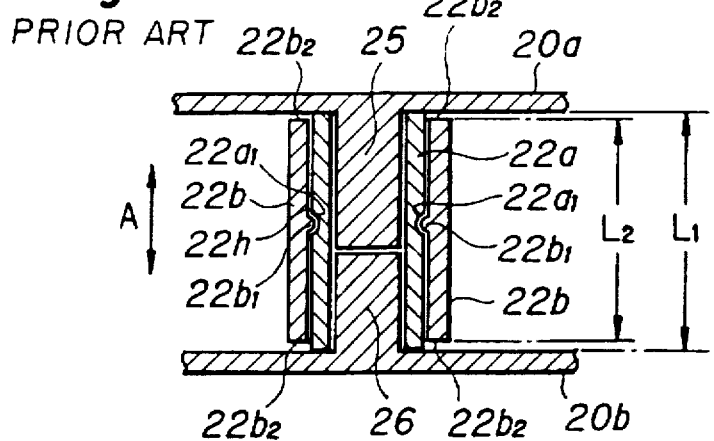
FIG. 9 is an explanatory diagram of a conventional rotating type of tape guide member.
Figure 10:
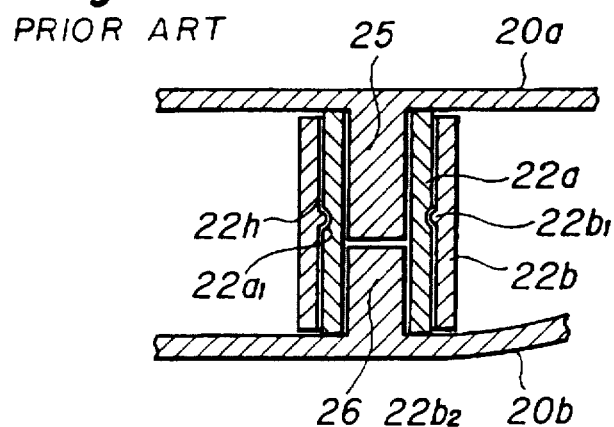
FIG. 10 is an explanatory diagram of the conventional rotating type of tape guide member when the guide member is contacted with a lower half.
Figure 11:
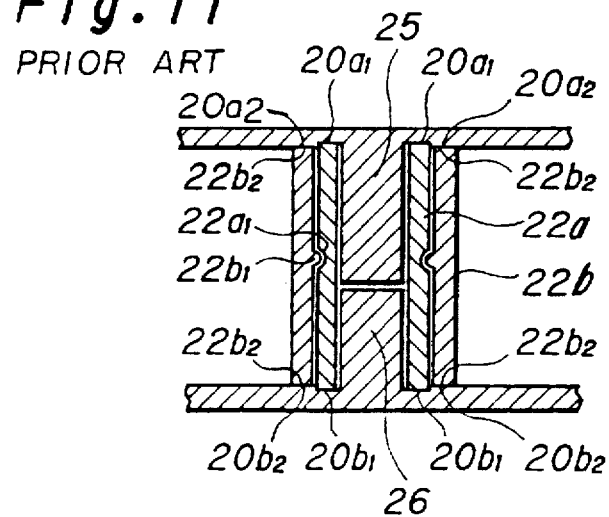
FIG. 11 is another explanatory diagram of the conventional rotating type of tape guide member when the guide member is contacted with halves thereof.

FIG. 5 shows another embodiment of this invention. In this embodiment, portions 8 and 9 which face the end surfaces $3b_2$ of the rotating member 3b on the upper and lower halves 1 and 2 are designed in such a concave shape that they are recessed downwardly from the inner flat surfaces of the upper and lower halves 1 and 2, and those portions which confront the end surfaces $3a_2$ of the fixed member 3a serve as convex portions 6 and 7 which project in the inward direction of the frame body relative to the concave portions 8 and 9. In this case, for example the flat surface portions 6a and 7a of the convex portions 6 and 7 may be designed so as to be located at the same height as the inner surface surfaces of the upper and lower halves 1 and 2 excluding the portions 8 and 9.

In this embodiment, a sufficient gap is also provided between the end surfaces $3b_2$ of the rotating member 3b and the upper and lower halves 1 and 2, and thus the contact between the end surfaces $3b_2$ of the rotating member 3b and the inner surfaces of the upper and lower halves 1 and 2 is effectively prevented, so that the rotational motion of the rotating member 3b can be smoothly carried out.

Figure 1:
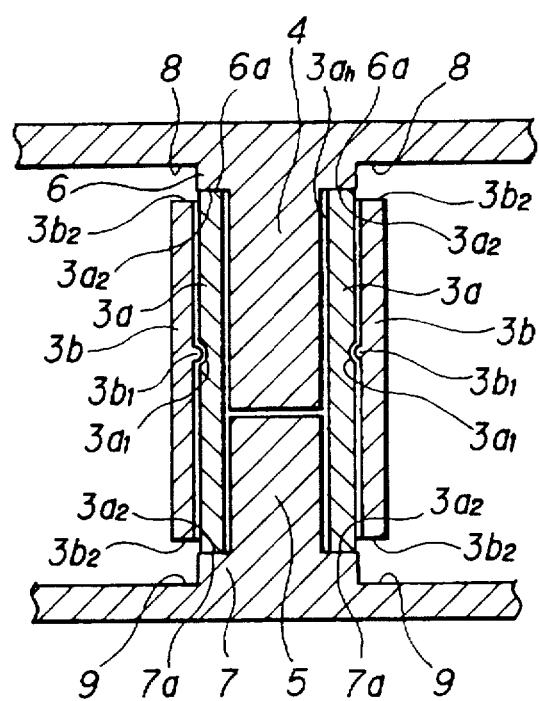
FIG. 1 is a cross-sectional view of the fixing state of the tape guide member for a tape cassette of an embodiment according to this invention.
Figure 2:
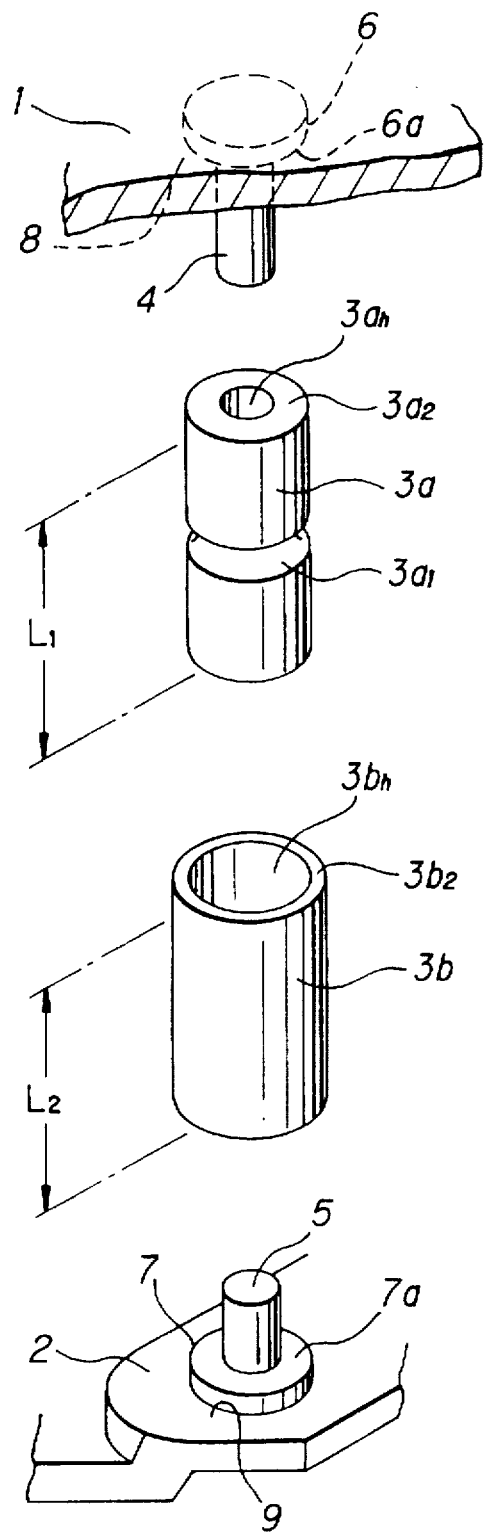
FIG. 2 is an exploded perspective view of a tape guide member and a boss of this embodiment.

Further, in this embodiment, the height dimension $L_2'$ of the rotating member 3b can be set to be longer than that in the first embodiment as shown in FIG. 1 ($L_2'>L_2$), yet no contact would occur even if the path of the magnetic tape is deviated in some degree in the thickness direction of the frame body.

This invention is applicable to all tape guide members with which the magnetic tape is slidably contacted so that its path is guided. Further, this invention may be applicable to any type of tape cassette such as an audio type, a video type, a data storage type or the like.

As described above, according to the tape cassette having the tape guide in which the rotating member is freely rotatably mounted around the fixed member, a step portion is provided between the first portion confronting the end surface of the fixed member and the second portion confronting the end surface of the rotating member so that the first portion is projected inward of the frame body relative to the second portion, so that a sufficient gap is provided between the rotating member and the upper half member and between the rotating member and the lower half member. Therefore, the rotational motion of the rotating member can be smoothly performed, and the stability of the tape running can be realized.

What is claimed is:

1. A tape cassette in which a tape is accommodated in a frame body comprising upper and lower half members and is wound around a pair of reels, comprising:

tape guide means for guiding the running position of the tape, said tape guide means having a substantially cylindrical fixed member having an axial bore and a substantially cylindrical tubular rotating member concentrically arranged around said fixed member, said fixed member having a height greater than a height of said rotating member, first and second bosses projected from respective inner flat surfaces of the upper and lower half members into said bore of said fixed member in respective first and second directions for securing said fixed member to the cassette, said rotating member being freely rotatably mounted on the outer peripheral surface of said fixed member and being prevented from shifting axially relative to said fixed member by a projection formed on an inner peripheral surface of said rotating member and extending inwardly in a radial direction thereof and a groove formed on an outer peripheral surface of said fixed member and extending inwardly in a radial direction thereof, said projection being engageable with said groove for preventing axial shifting, first and second raised step means arranged peripherally around said first and second bosses and having respective heights projecting beyond the respective inner flat surfaces of the upper and lower half members in said first and second directions for contacting respective end surfaces of said fixed member, said first and second raised step means extending respectively radially from a central axis of said first and second bosses a distance less than an inner peripheral radius of said tubular rotating member, wherein the heights of said first and second raised step means and said height of said fixed member determine a distance between said inner flat surfaces of said upper and lower half members so that A distance is created between respective end surfaces of said tubular rotating member and said inner flat surfaces of said upper and lower half members.

2. The tape cassette as claimed in claim 1, wherein said first and second raised step means are formed so as to have flat surfaces which contact respective end surfaces of said fixed member and are continuous in the peripheral direction.

3. The tape cassette as claimed in claim 1, wherein said first and second raised step means are formed as spokes, each having a flat surface contacting respective end surfaces of said fixed member.

4. A tape cassette in which a tape is accommodated in a frame body comprising upper and lower half members and is wound around a pair of reels, comprising:

tape guide means for guiding the running position of the tape, said tape guide means having a substantially cylindrical fixed member having an axial bore and a substantially cylindrical tubular rotating member concentrically arranged around said fixed member, said fixed member having a height greater than a height of said rotating member, first and second bosses projected from respective inner flat surfaces of the upper and lower half members into said bore of said fixed member in respective first and second directions for securing said fixed member to the cassette, said rotating member being freely rotatably mounted on the outer peripheral surface of said fixed member and being prevented from shifting axially relative to said fixed member by a projection formed on an inner peripheral surface of said rotating member and extending inwardly in a radial direction thereof and a groove formed on an outer peripheral surface of said fixed member and extending inwardly in a radial direction thereof, said projection being engageable with said grove for preventing axial shifting, first and second contact surfaces arranged peripherally around said first and second bosses and being coplanar with the respective inner flat surfaces of the upper and lower half members for contacting respective end surfaces of said fixed member whereby the height of said fixed member determines a distance between said inner flat surfaces of said upper and lower half members, said first and second contact surfaces respectively extend radially from a central axis of said first and second bosses a distance less than an inner peripheral radius of said tubular rotating member, and first and second annular recesses surrounding said first and second contact surfaces with a first radius smaller than a second radius formed in said inner flat surfaces of the upper and lower half members, said first and second annular recesses being arranged opposite each respective end surface of said rotating member and wherein said second radius of said first and second annular recesses is larger than an outer peripheral radius of said tubular rotating member and said first radius of said first and second annular recesses is smaller than said inner peripheral radius of said tubular rotating member.

5. A tape cassette with a tape wound around a pair of reels, comprising:

a frame body including:
a top cover and a bottom cover mated parallel with each other, wherein said top cover and said bottom cover include respective inner flat surfaces;
first and second bosses perpendicularly projected in an outward direction from said respective inner flat surfaces along a central axis;
first and second raised step means placed around said first and second bosses having respective heights extending in an outward direction from said respective inner flat surfaces and extending radially from said central axis a first distance;

tape guide means including:
a substantially cylindrical tubular fixed member having an axial bore forming an inner peripheral surface and an outer peripheral surface;
a substantially cylindrical tubular rotating member concentrically arranged around said fixed member, said fixed member having a height greater than a height of said rotating member, and wherein said rotating member is rotatably mounted on said outer peripheral surface of said fixed member;
engaging means for preventing said rotating member from shifting relative to said fixed member along said central axis;

said tape guide means being secured to said frame body by said first and second bosses being inserted into said bore of said fixed member and by contacting respective end surfaces of said fixed member with said first and second raised step means, whereby the heights of said first and second raised step means and said height of said fixed member determine a distance between said respective inner flat surfaces so that a distance is created between respective end surfaces of said rotating member and said respective inner flat surfaces, and whereby said first distance is smaller than an inner peripheral radius of said tubular member, thereby preventing binding of said rotating member when said top or bottom cover is warped.

6. The tape cassette as claimed in claim 5, wherein said first and second raised step means are formed so as to have flat surfaces which contact respective end surfaces of said fixed member and are continuous in the peripheral direction.

7. The tape cassette as claimed in claim 5, wherein said first and second raised step means are formed as spokes, each having a flat surface contacting respective end surfaces of said fixed member.

8. A tape cassette with a tape wound around a pair of reels, comprising:

tape guide means including:
a substantially cylindrical tubular fixed member having an axial bore forming an inner peripheral surface and an outer peripheral surface;
a substantially cylindrical tubular rotating member concentrically arranged around said fixed member, said fixed member having a height greater than a height of said rotating member, and wherein said rotating member is rotatably mounted on said outer peripheral surface of said fixed member;
engaging means for preventing said rotating member from shifting relative to said fixed member along said central axis;

a frame body including:
a top cover and a bottom cover mated parallel with each other, wherein said top cover and said bottom cover include respective inner flat surfaces;
first and second bosses perpendicularly projected from said respective inner flat surfaces in an outward direction from said respective inner flat surfaces along a central axis;
first and second contact surfaces placed around said first and second bosses and being coplanar with said respective inner flat surfaces for contacting respective end surfaces of said fixed member, whereby the height of said fixed member determines a distance between said respective inner flat surfaces, said first and second contact surfaces respectively extend radially from said central axis a distance less than an inner peripheral radius of said rotating member; and
first and second annular recesses surrounding said first and second contact surfaces with a first radius smaller than a second radius formed in said inner flat surfaces of the upper and lower half members, said first and second annular recesses being arranged opposite each respective end surface of said rotating member and wherein said second radius of said first and second annular recesses is larger than an outer peripheral radius of said rotating member and said first radius of said first and second annular recesses is smaller than said inner peripheral radius of said rotating member, thereby preventing binding of said rotating member when said top or bottom cover is warped.

* * * * *